(12) United States Patent
Han et al.

(10) Patent No.: US 10,625,796 B2
(45) Date of Patent: Apr. 21, 2020

(54) AUTO-LEVELING DRIVE AXLE DEVICE FOR WHEELED TRACTOR, AND LEVELING METHOD

(71) Applicant: JIANGSU UNIVERSITY, Zhenjiang (CN)

(72) Inventors: Jiangyi Han, Zhenjiang (CN); Gaogao Shang, Zhenjiang (CN); Changgao Xia, Zhenjiang (CN); Xiang Gao, Zhenjiang (CN); Jing Liu, Zhenjiang (CN)

(73) Assignee: JIANGSU UNIVERSITY, Zhenjiang, Jiangsu (CN)

(*) Notice: Subject to any disclaimer, the term of this patent is extended or adjusted under 35 U.S.C. 154(b) by 40 days.

(21) Appl. No.: 16/070,091

(22) PCT Filed: May 17, 2017

(86) PCT No.: PCT/CN2017/084645
§ 371 (c)(1),
(2) Date: Jul. 13, 2018

(87) PCT Pub. No.: WO2017/211167
PCT Pub. Date: Dec. 14, 2017

(65) Prior Publication Data
US 2019/0009844 A1 Jan. 10, 2019

(30) Foreign Application Priority Data
Jun. 8, 2016 (CN) .......................... 2016 1 0405558

(51) Int. Cl.
B62D 49/08 (2006.01)
B60G 17/0165 (2006.01)
(Continued)

(52) U.S. Cl.
CPC ............ *B62D 49/08* (2013.01); *B60B 35/001* (2013.01); *B60G 17/0165* (2013.01);
(Continued)

(58) Field of Classification Search
CPC .... B62D 49/08; B60B 35/001; B60K 17/046; B60Y 2200/221; B60G 2800/912;
(Continued)

(56) References Cited

U.S. PATENT DOCUMENTS 4,612,996 A * 9/1986 Wolf .................... A01B 69/007
104/165
4,669,566 A * 6/1987 Bergius .................... B60G 9/02
180/41

(Continued)

FOREIGN PATENT DOCUMENTS

| CN | 201457674 U | 5/2010 |
| CN | 102295028 A | 12/2011 |

(Continued)

OTHER PUBLICATIONS

International Search Report for PCT/CN2017/084645, dated Aug. 8, 2017.

*Primary Examiner* — Keith J Frisby
(74) *Attorney, Agent, or Firm* — Heslin Rothenberg Farley & Mesiti, P.C.

(57) ABSTRACT

An auto-leveling drive axle device for a wheel tractor, and leveling method. The device comprises a transmission device and a leveling device. The device of the present invention changes only a vertical position of a drive axle with respect to a wheel, and a wheel shaft distance and wheel center spacing are not changed, thus improving traveling stability of a vehicle.

10 Claims, 3 Drawing Sheets

(51) Int. Cl.
*B60B 35/00* (2006.01)
*B60G 17/019* (2006.01)
*B60K 17/04* (2006.01)
*E02F 9/22* (2006.01)

(52) U.S. Cl.
CPC ...... *B60G 17/01908* (2013.01); *B60K 17/046* (2013.01); *B60G 2204/419* (2013.01); *B60G 2300/082* (2013.01); *B60G 2400/0511* (2013.01); *B60G 2400/0512* (2013.01); *B60G 2800/0192* (2013.01); *B60G 2800/0194* (2013.01); *B60G 2800/912* (2013.01); *B60Y 2200/221* (2013.01); *E02F 9/2257* (2013.01)

(58) Field of Classification Search
CPC .... B60G 2800/0194; B60G 2800/0192; B60G 2204/419; B60G 2300/082; B60G 17/0165; B60G 17/01908; B60G 17/01916; B60G 17/01925; B60G 2400/0511; B60G 2400/0512; E02F 9/2257
USPC ................. 280/5.507, 6.154; 180/41; 56/209
See application file for complete search history.

(56) References Cited

U.S. PATENT DOCUMENTS

| | | | | |
|---|---|---|---|---|
| 5,639,119 | A | * | 6/1997 | Plate ........................ B60G 9/02 |
| | | | | 280/124.112 |
| 5,896,731 | A | * | 4/1999 | Scheid ................. A01D 75/285 |
| | | | | 56/10.2 R |
| 9,133,586 | B2 | | 9/2015 | Reuter et al. |
| 9,409,459 | B2 | * | 8/2016 | Solbrack .............. B60G 15/067 |

FOREIGN PATENT DOCUMENTS

| | | | | | |
|---|---|---|---|---|---|
| CN | 202587793 | U | | 12/2012 | |
| CN | 103144498 | A | | 6/2013 | |
| CN | 104149573 | A | | 11/2014 | |
| CN | 104428199 | A | | 3/2015 | |
| CN | 204432812 | U | | 7/2015 | |
| CN | 106043473 | A | | 10/2016 | |
| CN | 206171100 | U | | 5/2017 | |
| DE | 1921804 | A1 | * | 11/1969 | .......... B60G 17/033 |
| DE | 102005060173 | A1 | | 7/2006 | |
| FR | 2577879 | A3 | * | 8/1986 | ............. B62D 49/08 |
| FR | 2609262 | A1 | * | 7/1988 | .......... B60G 17/033 |
| FR | 2809196 | A1 | * | 11/2001 | |

\* cited by examiner

AUTO-LEVELING DRIVE AXLE DEVICE FOR WHEELED TRACTOR, AND LEVELING METHOD

CROSS REFERENCE TO RELATED APPLICATIONS

This application is a U.S. National Phase filing under 35 U.S.C. § 371 of International Application PCT/CN2017/084645, filed May 17, 2017, and published as WO2017/211167 A1 on Dec. 14, 2017. PCT/CN2017/084645 claims priority from Chinese Patent Application Number 201610405558.7, filed Jun. 8, 2016. The entire contents of each of these applications are hereby expressly incorporated herein by reference.

TECHNICAL FIELD

The present invention belongs to the technical field of tractors, in particular to an auto-leveling drive axle device for a wheeled tractor and a leveling method.

BACKGROUND ART

As the level of agricultural mechanization is improved in China, tractors applicable to hilly uplands have been developed to some degree. Hillside tractors not only can improve the degree of mechanization in hilly upland regions, but also can improve the living conditions of workers in mountainous regions. To adapt to the topographical characteristics of hilly uplands, body attitude leveling of hillside tractors is an important requirement for hillside tractors during use. The body leveling of a conventional hillside tractor is controlled manually by an operator; in addition, at present, existing hillside tractors in China are mainly walking tractors and mini-type caterpillar tractors, and there is no relating references or patent search reports refer to a drive axle with a body auto-leveling function for a four-wheel drive tractor.

Up to now, in the patent search carried out with keywords "hillside tractor" and "auto-leveling", the following four patent publications have been found:
1. Hillside Tractor with Transverse Leveling Body (application No.: CN201520084082.2, publication No.: CN204432812U) introduces a tractor capable of transverse leveling adjustment. In overall layout, the split-type frame is articulated and consists of a front frame, a middle frame and a rear frame, which are articulated together, and a roll-waist turning method is used; a frame leveling detection signal is generated as a mercury switch mounted on the frame is inclined, and the signal is used to control solenoid directional valves, and thereby the relative distance from the reducer of two driving wheels at one side to the frame is adjusted, and leveling control in the transverse direction is realized.
2. Remotely Controlled Hillside Tractor (application No.: CN201010215718.4) introduces a caterpillar tractor that can be remotely controlled to operate on a hilly upland, wherein, the power is transferred via a transmission case directly to the driving wheels of caterpillar tracks, and two hydraulic cylinders on the two sides of the frame are connected to the supporting frames of the left and right track rollers and the tractor body; a body auto-leveling signal is issued from the processor in a remote controller to control the hydraulic oil cylinders to ascend and descend, and thereby transverse leveling of the tractor body is realized.
3. Transmission Mechanism for Hillside Tractor (application No.: CN200920093628.5), in which the power transfer between a transmission semi-axle and a driving wheel is implemented via a sprocket structure, the wheel spacing is adjustable, but there is no tractor body leveling function.
4. Balance Device for Hillside Walking Tractor (application No.: CN201220194143.7) provides a balance control device for a walking tractor, which utilizes left and right hydraulic oil cylinders to adjust the positions of the transmission case and the driving wheels to attain a purpose of body attitude leveling.

It is seen from the result of the patent search: in the patent publication 1, the device can realize transverse vehicle body leveling, but the vehicle frame consists of three pieces articulated together, causing increased traveling instability on a hillside land; in addition, in the transverse leveling process of the drive axle, the distances from the centers of the wheels to the vehicle body are adjusted by turning the wheels and the transmission mechanism around the vehicle body longitudinally; as a result, though the vehicle body is leveled, the axle spacing between front and rear wheels and the wheel spacing between left and right wheels are changed, and consequently the load ratios of the wheels are changed, and finally the wheel adhesion is changed accordingly; besides, since the axle spacing and wheel spacing are changed, the instability of the entire vehicle is increased, and the steering performance parameters of the entire vehicle are also changed due to the change of the wheel spacing and axle spacing parameters, bringing increased difficulties in steering operation by the driver. In the patent publication 2, the positions of the left and right caterpillar tracks with respect to the vehicle body are controlled wirelessly and automatic electrical body leveling control is realized, but the advantage of high power transmission efficiency of a wheeled tractor is missing; in the patent publication 3, the power of the driving wheels of the hillside tractor is transferred by means of a sprocket structure, but the power transmission efficiency of sprocket transmission is not as high as that of gear transmission; in addition, there is no vehicle body auto-leveling function; the patent publication 4 discloses a balance device for a walking tractor, in which the elevations of the driving wheels with respect to the vehicle body are changed by rotating the driving wheels and the reduction gear mechanism around the vehicle body; since the driving wheels and the reduction gear mechanism rotate around the vehicle body in the longitudinal direction, the positions of the driving wheels with respect to the vehicle body in the longitudinal direction are also changed as the elevations of the driving wheels are changed; consequently, for a four-wheel tractor, the vehicle body load on the left and right driving wheels are changed, and the wheel adhesion is also changed; besides, owing to the change of the wheel spacing, the steering performance parameters of the entire vehicle changes, it is adverse to the steering operations; moreover, automatic longitudinal leveling control is not realized.

CONTENTS OF THE INVENTION

To meet the requirement for the drive axle and transmission system structure of hillside tractor and tractor body attitude leveling, the present invention provides a drive axle with an auto-leveling function for a wheeled tractor. When the drive axle is used on a tractor traveling on a hilly upland, the attitude parameters of the drive axle transverse inclination and the entire vehicle longitudinal inclination, are acquired by means of a transverse inclination sensor on the drive axle and a longitudinal inclination sensor on the entire vehicle, the hydraulic system is controlled by an electronic control unit, and finally the elevations of the driving wheels at the two ends of the drive axle with respect to the drive axle housing are adjusted with a hydraulic drive technique, so that the chassis of the vehicle is kept in a transverse and longitudinal horizontality state; in the adjustment process, the driving force from the four driving wheels can be transferred without interruption, the wheel spacing and axle spacing parameters of the tractor are kept unchanged, and the steering performance of the tractor is not affected. The technical scheme of the present invention is as follows:

An auto-leveling drive axle device for a wheeled tractor. The device comprises a transmission device and a leveling device; wherein, the transmission device comprises a drive axle housing, a half-shaft bevel gear, a vertical transmission shaft, and a wheel-side planetary reduction gear mechanism; the upper end of vertical transmission shaft is equipped with a vertical shaft upper bevel gear that can slide upward and downward along the vertical transmission shaft, and a lower end of vertical transmission shaft is integrally fixed with a vertical shaft lower bevel gear; the half-shaft bevel gear is mounted in the drive axle housing and the rotation of the half-shaft bevel gear in the drive axle housing is driven by engine power; the half-shaft bevel gear meshes with the vertical shaft upper bevel gear, to drive the rotation of the vertical shaft upper bevel gear; the rotation of the vertical transmission shaft is driven by the rotation of the vertical shaft upper bevel gear, and thereby drives the rotation of the vertical shaft lower bevel gear; the vertical shaft lower bevel gear meshes with a bevel gear of the wheel-side planetary reduction gear mechanism, to drive the rotation of a wheel by the wheel-side planetary reduction gear mechanism; and Wherein, the leveling device employs a hydraulic system, the hydraulic system drives the drive axle housing to move upward and downward with respect to the wheel, so that the drive axle housing is kept horizontality.

Furthermore, the hydraulic system comprises an inclination sensor, an electronic control unit, a solenoid hydraulic directional valve, and a hydraulic cavity device communicated with the solenoid hydraulic directional valve; the inclination sensor is connected to the electronic control unit, the electronic control unit controls a port of the solenoid hydraulic directional valve according to the information from the inclination sensor to open or close, so as to increase or decrease the amount of a liquid in the hydraulic cavity device; the hydraulic cavity device can drive the drive axle housing to move upward and downward.

Furthermore, the hydraulic cavity device comprises a vertical cylinder tube and a vertical cylinder body; the vertical cylinder tube is sleeved over the vertical cylinder body on top end of thereof, a hydraulic cavity is formed between the vertical cylinder body and the vertical cylinder tube, and the vertical cylinder body is supported by the vertical cylinder tube; the hydraulic cavity is connected through a hydraulic pipeline to the solenoid hydraulic directional valve of the hydraulic system; the position of the vertical cylinder body and the position of wheel center are limited by the wheel-side planetary reduction gear mechanism; the vertical cylinder tube is fixedly connected to the drive axle housing; the vertical cylinder tube can move upward and downward along the vertical cylinder body, and thereby drives the drive axle housing to move upward and downward; the vertical transmission shaft penetrates through the center of the vertical cylinder tube and the center of the vertical cylinder body, and can rotate with respect to the vertical cylinder tube and the vertical cylinder body.

Furthermore, the vertical cylinder tube is dynamically sealed against the vertical cylinder body; the vertical transmission shaft is dynamically sealed against the vertical cylinder tube and the vertical cylinder body respectively.

Furthermore, the inclination sensor is a transverse inclination sensor or a longitudinal inclination sensor, the transverse inclination sensor is mounted on the drive axle housing, the longitudinal inclination sensor is mounted on a frame; the electronic control unit comprises a single-chip and peripheral signal acquisition and operational amplifier circuits.

Furthermore, the half-shaft bevel gear is mounted on the drive axle housing by a bearing; the vertical shaft upper bevel gear is connected to the vertical transmission shaft by a spline.

Furthermore, the drive axle device is applied on a front drive axle and a rear drive axle of the wheeled tractor; the front drive axle is connected to the frame by a ball-hinge connective pair of which the ball center is in the extension line of a front axle driving shaft; the rear drive axle is connected to the frame by two ball-hinge connective pairs of which the center point of a connecting line segment between the ball centers of the two ball-hinge connective pairs is located on a rear axle driving shaft.

Furthermore, the drive axle device may also be applied on the chassis of a hillside tractor or the like self-travel machine.

According to the drive axle device described above, the present invention further provides an method of auto-leveling for a wheeled tractor, comprises:

a. when the entire tractor is transversely inclined, detecting the transverse inclination angle of the drive axle housing by the transverse inclination sensor mounted on the drive axle housing, and transmitting a signal of the detected inclination angle by the transverse inclination sensor, to the electronic control unit;

b. issuing a command by the electronic control unit to the solenoid hydraulic directional valve of the hydraulic system according to the signal detected by transverse inclination, so that two ports of the solenoid hydraulic directional valve are energized, and thereby an oil cavity at a lower side is fed with oil, while an oil cavity at a higher side discharges oil;

c. pushing the vertical cylinder tube to displace upward and thereby driving the lower side of the drive axle housing to move upward, by the oil cavity fed with oil, owing to increased volume of the oil cavity; pushing the vertical cylinder tube to move downward and thereby driving the higher side of the drive axle housing to move downward, by the oil cavity that discharges oil, under the gravity load of the drive axle housing, till the two ends of the drive axle housing are horizontality;

d. when the transverse inclination sensor detects that the transverse inclination is 0, controlling the solenoid hydraulic directional valve by the electronic control unit, so that neither port of the solenoid hydraulic directional valve is energized and the valve spool is located in a middle position, and thereby the distances from the two ends of the drive axle housing to the wheel centers of a left wheel and a right wheel are kept unchanged respectively, and thus the auto-transverse-leveling process of the drive axle is accomplished.

Furthermore, the method further comprises: utilizing the longitudinal sensor mounted on the frame to realize longitudinal leveling of the wheeled tractor.

The present invention has the following beneficial effects:
1. The auto-leveling drive axle provided in the present invention may be applied on the chassis of a hillside tractor or the like self-travel machine. When the tractor travels on a hillside upland, the body of the tractor may be kept in horizontality state in transverse direction and longitudinal direction by means of the auto-leveling function of the drive axle, and thereby the stability of the chassis of the tractor or self-travel machine is improved;
2. In the drive axle attitude leveling process, only the positions of the driving wheel with respect to the vehicle body in the vertical direction are changed, while the axle spacing of the front and rear driving wheels in the longitudinal direction remains unchanged essentially; therefore, the bearing load ratio between the front drive axle and the rear drive axle is not changed, and the traveling stability of the vehicle is improved.
3. Since the axle spacing and wheel spacing are kept unchanged essentially in the drive axle auto-leveling process, the steering performance parameters of the entire vehicle remain unchanged essentially. Such a scheme is advantageous for the steering system design of the entire vehicle.

BRIEF DESCRIPTION OF THE SYMBOLS

1—transverse inclination sensor; 2—drive axle housing; 3—half-shaft bevel gear; 4—vertical transmission shaft; 5—vertical shaft upper bevel gear; 6—vertical cylinder tube; 7—vertical cylinder body; 8—wheel; 9—wheel-side planetary reduction gear mechanism; 10—solenoid hydraulic directional valve; 11—vertical shaft lower bevel gear; 12—electronic control unit; 13—left vertical cylinder tube; 14—left oil cavity; 16—left wheel; 17—right vertical cylinder tube; 18—right oil cavity; 20—right wheel; 23—longitudinal inclination sensor; 24—frame; 26—first ball-hinge connective pair; 27—front drive axle; 30—rear drive axle; 31—second ball-hinge connective pair; 32—rear axle driving shaft; 33—front axle driving shaft.

EMBODIMENTS

Hereunder the present invention will be further detailed in embodiments with reference to the accompanying drawings, but the protection scope of the present invention is not limited to those embodiments.

1) Structure and Connections of Drive Axle of Tractors with Self-Leveling

Figure 1:
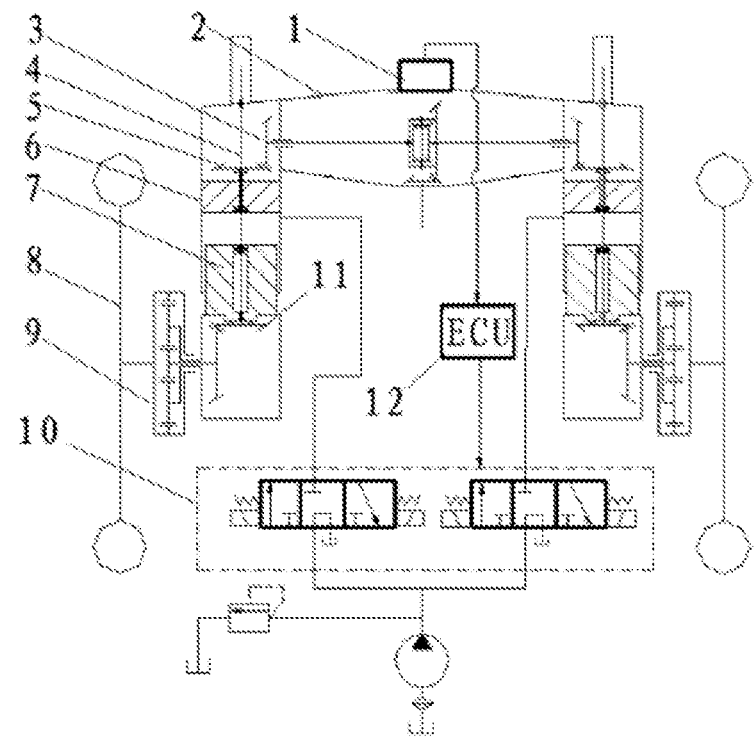
FIG. 1 is a structural schematic diagram of the auto-leveling drive axle device for a wheeled tractor according to the present invention.

As shown in FIG. 1, the device provided in the present invention comprises a transverse inclination sensor 1, a drive axle housing 2, a half-shaft bevel gear 3, a vertical transmission shaft 4, a vertical shaft upper bevel gear 5, a vertical cylinder tube 6, a vertical cylinder body 7, a wheel-side planetary reduction gear mechanism 9, a hydraulic system and a solenoid hydraulic directional valve 10, a vertical shaft lower bevel gear 11 and an electronic control unit 12. The half-shaft bevel gear 3 is mounted on the drive axle housing 2 by a bearing, the vertical shaft upper bevel gear 5 is mounted to the upper end of the vertical transmission shaft 4 by a spline and can slide upward and downward along the vertical transmission shaft 4, the vertical shaft lower bevel gear 11 is integrally formed with the bottom end of the vertical transmission shaft 4, the half-shaft bevel gear 3 meshes with the vertical shaft upper bevel gear 5, and the vertical shaft lower bevel gear 11 meshes with a bevel gear in the wheel-side planetary reduction gear mechanism 9; the half-shaft bevel gear 3 transfers the power to the vertical shaft upper bevel gear 5, the vertical transmission shaft 4, the vertical shaft lower bevel gear 11, the wheel-side planetary reduction gear mechanism 9 and the wheel 8 sequentially, to drive the wheel 8. The vertical transmission shaft 4 is mounted in a way that it penetrates through the center of the vertical cylinder tube 6 and the center of the vertical cylinder body 7 and can rotate with respect to the vertical cylinder tube 6 and the vertical cylinder body 7, the vertical transmission shaft 4 is dynamically sealed against the vertical cylinder tube 6 and the vertical cylinder body 7 respectively at the parts where the vertical transmission shaft 4 contacts with the vertical cylinder tube 6 or the vertical cylinder body 7; the vertical cylinder tube 6 is sleeved over the vertical cylinder body 7, the vertical cylinder body 7 is dynamically sealed against the vertical cylinder tube 6, and the vertical cylinder tube 6 supports the vertical cylinder body 7 and can move upward and downward with respect to the vertical cylinder body 7, and, in that way, the vertical cylinder tube 6 and the vertical cylinder body 7 constitute a hydraulic cavity; the vertical cylinder tube 6 is rigidly and fixedly connected to the drive axle housing 2, and the position of the vertical cylinder body 7 and the position of the center of the wheel 8 are limited by the wheel-side planetary reduction gear mechanism 9; when hydraulic oil liquid flows into or out of the hydraulic cavity (oil cavity) formed by the vertical cylinder tube 6 and the vertical cylinder body 7, the vertical relative positions of the vertical cylinder tube 6 and the vertical cylinder body 7 are changed, and thereby the drive axle housing 2 is driven to displace relative to the wheel 8 in the vertical direction; when the positions of the vertical cylinder tube 6 and the vertical cylinder body 7 are changed in the vertical direction, the vertical shaft upper bevel gear 5 can slide on the vertical transmission shaft 4 to keep the meshing position between the vertical shaft upper bevel gear 5 and the half-shaft bevel gear 3 unchanged; at the same time, the meshing position between the vertical shaft lower bevel gear 11 and the bevel gear in the wheel-side planetary reduction gear mechanism 9 is kept unchanged.

2) Working Principle of Auto-Leveling Drive Axle for Tractor

As shown in FIG. 1, when the left and right wheels of the drive axle are located on a slope, the transverse inclination sensor 1 detects the transverse inclination angle of the drive axle housing 2 and transmits a signal to the electronic control unit 12, the electronic control unit 12 controls the solenoid hydraulic directional valve 10 according to the signal from the transverse inclination sensor 1, to adjust the positions of the left and right vertical cylinder tubes and vertical cylinder bodies of the drive axle in the vertical direction by the hydraulic system, and thereby to adjust the elevations of the left and right ends of the drive axle housing 2 with respect to the left and right wheels in the vertical direction, so that the drive axle is kept in a horizontality state. Since the vertical transmission shaft 4 can rotate with respect to the vertical cylinder tube 6 and the vertical cylinder body 7, the power transmission of the drive axle and the diversion of the wheel 8 are not affected and the left and right wheel spacing remains unchanged during the self-leveling process of the drive axle.

EXAMPLES

An embodiment of the auto-leveling drive axle device for a wheeled tractor and the control method provided in the present invention are as follows.

Figure 2:
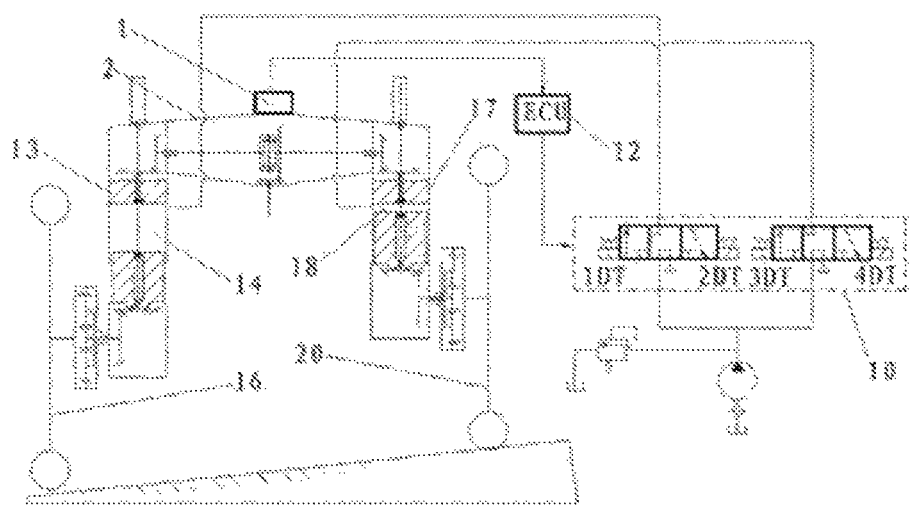
FIG. 2 is a schematic diagram of the auto-leveling drive axle for a wheeled tractor applied to the embodiments of transverse inclination leveling according to the present invention.

1) The Use of Transverse Inclination Auto-Leveling of the Drive Axle of a Tractor: When the tractor walks on a hilly upland, the drive axle may be inclined transversely, the left end of the drive axle is lower while the right end of the drive axle is higher, as shown in FIG. 2, and, as a result, the entire tractor is inclined transversely. When the auto-leveling drive axle for a tractor provided in the present invention is used, the transverse inclination sensor 1 mounted on the drive axle housing 2 detects the transverse inclination angle of the drive axle housing 2, and transmits a signal of detected inclination angle to the electronic control unit 12; the electronic control unit 12 issues a command to the solenoid hydraulic directional valve 10 of the hydraulic system according to the signal of detected transverse inclination angle, and thereby the 1DT and 4DT of the solenoid hydraulic directional valve 10 are energized; since the 1DT is energized, the hydraulic system supplies oil to the left oil cavity 14, and the volume of the left oil cavity 14 is increased accordingly; thus, the left vertical cylinder tube 13 is pushed to displace upward, and the left end of the drive axle housing 2 moves upward; at the same time, since the 4DT of the solenoid hydraulic directional valve 10 is energized, the oil circuit of the right oil cavity 18 is communicated with the oil tank of the hydraulic system, the right vertical cylinder tube 17 moves downward under the gravity load of the drive axle housing 2, and the volume of the right oil cavity 18 is decreased accordingly; thus, the right end of the drive axle housing 2 is descended, till the left and right ends of the drive axle housing 2 are in a horizontality state; at this point, the transverse inclination angle detected by the transverse inclination sensor 1 is 0, the electronic control unit 12 controls the solenoid hydraulic directional valve 10 so that any of the 1DT, 2DT, 3DT and 4DT is not energized, and the valve spool is located in a middle position, thereby the distance from the left and right ends of the drive axle housing 2 to the centers of the left wheel 16 and right wheel 20 are kept unchanged respectively; thus, the auto-leveling process of the drive axle is accomplished.

Figure 3:
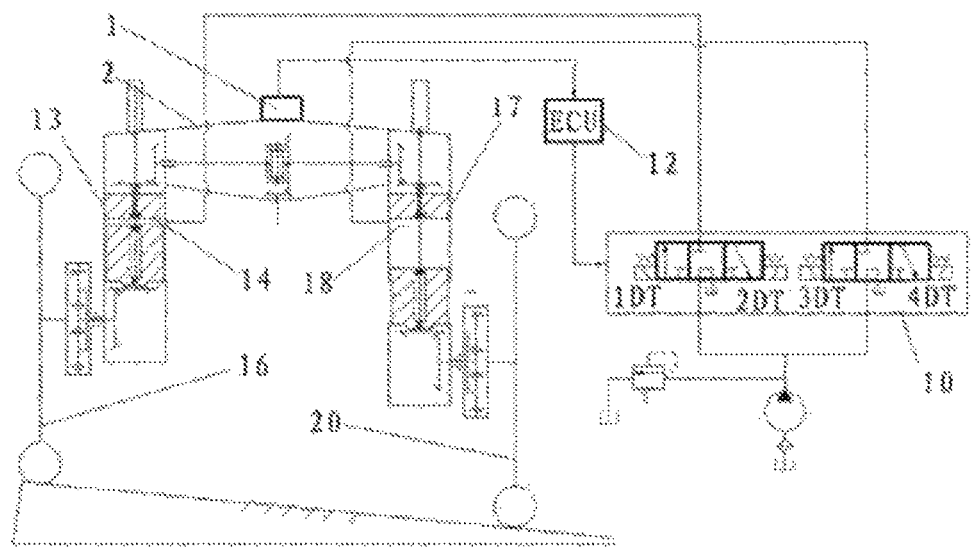
FIG. 3 is a schematic diagram of the auto-leveling drive axle for a wheeled tractor applied to the embodiments of transverse inclination leveling according to the present invention.

On the contrary, when the tractor walks on a hilly upland, if drive axle is transversely inclined in a state that the left end of the drive axle is higher while the right end of the drive axle is lower, as shown in FIG. 3, the transverse inclination sensor 1 mounted on the drive axle housing 2 detects a transverse inclination signal, the electronic control unit 12 issues a command to the solenoid hydraulic directional valve 10 of the hydraulic system according to the signal of transverse inclination, so that the 2DT and 3DT of the solenoid hydraulic directional valve 10 are energized; thus, the right oil cavity 18 is fed with oil, the right vertical cylinder tube 17 is pushed to move upward, and drives the right end of the drive axle housing 2 to move upward; the left oil cavity 14 discharges oil under the gravity load of the drive axle, the left vertical cylinder tube 13 is descended and drives the left end of the drive axle housing 2 to move downward, till the left and right ends of the drive axle housing 2 enter into a horizontality state, the electronic control unit 12 controls the de-energizing of the 2DT and 3DT of the solenoid hydraulic directional valve 10, and the solenoid hydraulic directional valve 10 is in a neutrality state; thus, the transverse inclination auto-leveling process of the driving axle housing is accomplished.

Figure 4:
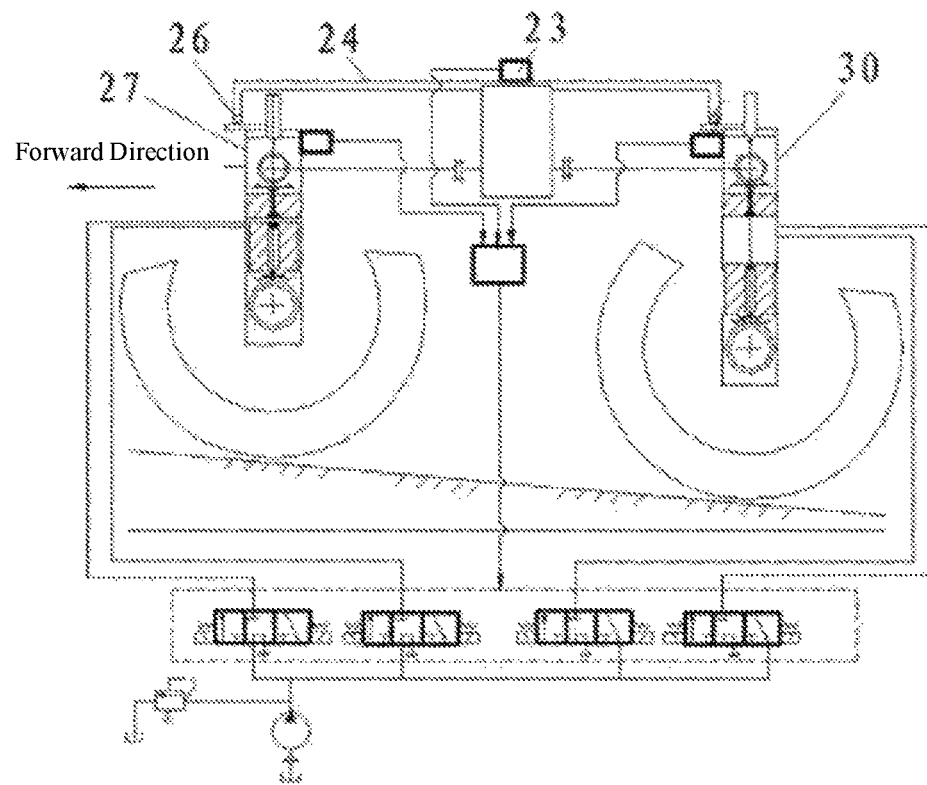
FIG. 4 is a side view of the use of the auto-leveling drive axle for a tractor in longitudinal leveling of the frame of a four-wheel tractor according to the present invention.
Figure 5:
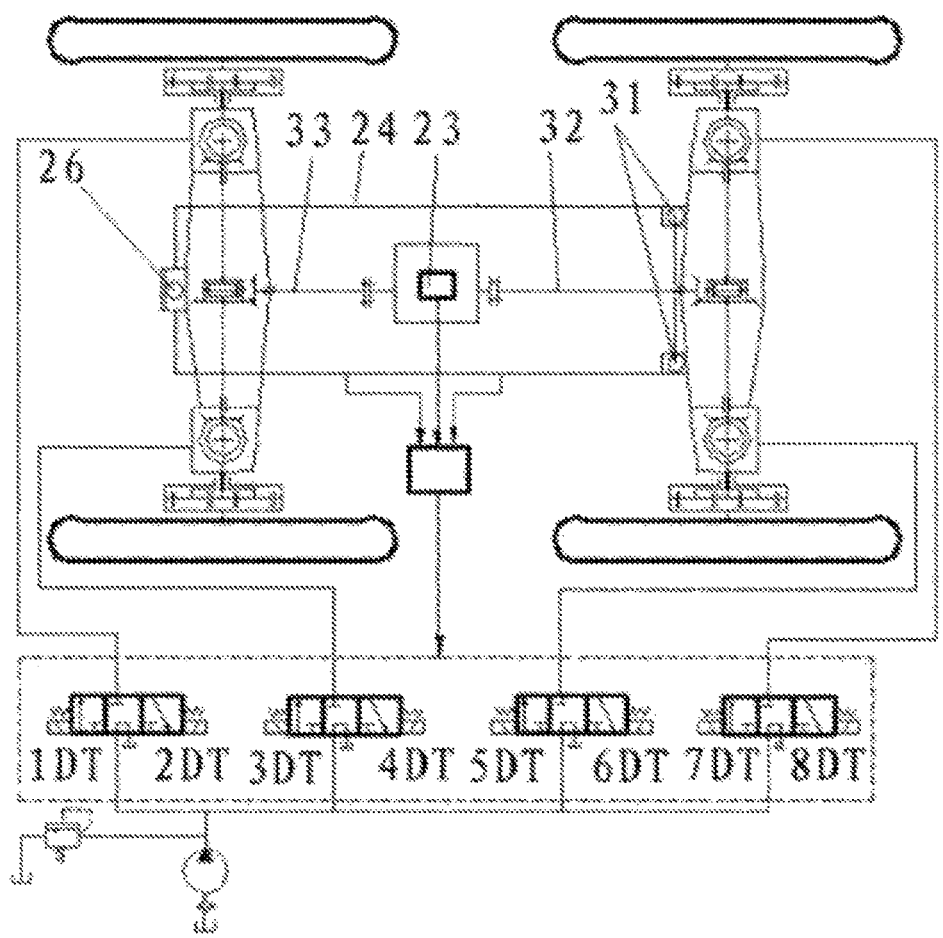
FIG. 5 is a top view of the use of the auto-leveling drive axle for a tractor in longitudinal leveling of the frame of a four-wheel tractor according to the present invention.

2) The Use of the Drive Axle for a Tractor in Longitudinal Inclination Leveling of the Frame of a Four-Wheel Tractor As shown in FIG. 4 and FIG. 5, FIG. 4 is a side view of the auto-leveling drive axle for a tractor applied to longitudinal leveling of the frame of a four-wheel tractor; FIG. 5 is a top view of the auto-leveling drive axle for a tractor applied to longitudinal leveling of the frame of a four-wheel tractor. As shown in FIG. 4 and FIG. 5, both the front drive axle and the rear drive axle of the four-wheel tractor employ the auto-leveling drive axle structure of the present invention. The frame 24 is connected to the front drive axle 27 by a first ball-hinge connective pair 26 and is connected to the rear drive axle 30 by two second ball-hinge connective pair 31; in addition, the ball center of the first ball-hinge connective pair 26 is in an extension line of the front axle driving shaft 33, and the rear axle driving shaft 32 passes through the center point of a connecting line segment between the ball centers of the two second ball-hinge connective pairs 31. When the tractor operates on a slopping land, if the front drive axle 27 and the rear drive axle 30 are transversely inclined, the front drive axle 27 and the rear drive axle 30 can be leveled automatically in the transverse direction according to the principle of auto-leveling described above in the use of transverse auto-leveling of the drive axle. The principle and the adjusting process are not further detailed here.

As shown in FIG. 4, if there is elevation difference between the ground contact points of the front wheels and the ground contact points of the rear wheels of the tractor, the frame 24 inevitably has longitudinal inclination. In such a case, the longitudinal inclination sensor 23 mounted on the frame 24 transmits the longitudinal inclination angle to the electronic control unit 12, the electronic control unit 12 issues a command to the solenoid hydraulic directional valves 10, so that the 2DT and 4DT are energized, the volume of oil fluids in the two oil cavities of the front drive axle 27 is decreased, and the position of front drive axle 27 is descended; at the same time, the 5DT and 7DT are energized, the volume of oil fluids in the two oil cavities of the rear drive axle 30 is increased, and the position of rear drive axle 30 is raised. When the longitudinal inclination sensor 23 detects that the transverse inclination of the vehicle 24 is 0, i.e., the frame 24 is in a horizontality state, the electronic control unit 12 controls the de-energizing of the 1DT, 2DT, 3DT, 4DT, 5DT, 6DT, 7DT and 8DT of the solenoid hydraulic directional valves 10; thus, the longitudinal auto-leveling process of the frame is accomplished.

The above detailed description is provided only to describe some feasible embodiments of the present invention rather than limit the protection scope of the present invention. Any equivalent embodiment or modification implemented without departing from the spirit of the present invention shall be deemed as falling in the protection scope of the present invention.

The invention claimed is:

1. An auto-leveling drive axle device for a wheeled tractor comprising a transmission device and a leveling device; wherein the transmission device comprises a drive axle housing, a half-shaft bevel gear, a vertical transmission shaft, and a wheel-side planetary reduction gear mechanism; the upper end of the vertical transmission shaft is equipped with a vertical shaft upper bevel gear that can slide upward and downward along the vertical transmission shaft, and a lower end is integrally fixed with a vertical shaft lower bevel gear;

wherein the half-shaft bevel gear is mounted in the drive axle housing, and the rotation of the half-shaft bevel gear in the drive axle housing is driven by engine power;

the half-shaft bevel gear meshes with the vertical shaft upper bevel gear, to drive the rotation of the vertical shaft upper bevel gear;

the rotation of the vertical transmission shaft is driven by the rotation of the vertical shaft upper bevel gear, and thereby drives the rotation of the vertical shaft lower bevel gear;

the vertical shaft lower bevel gear meshes with a bevel gear of the wheel-side planetary reduction gear mechanism, to drive the rotation of a wheel by the wheel-side planetary reduction gear mechanism; and the levelling device employs a hydraulic system, the hydraulic system drives the drive axle housing to move upward and downward with respect to the wheel, so that the drive axle housing is kept horizontal.

2. The auto-leveling drive axle device for a wheeled tractor according to claim 1, wherein, the hydraulic system comprises an inclination sensor, an electronic control unit, a solenoid hydraulic directional valve, and a hydraulic cavity device in communication with the solenoid hydraulic directional valve; the inclination sensor is connected to the electronic control unit, the electronic control unit controls a port of the solenoid hydraulic directional valve according to the information from the inclination sensor to open or close, so as to increase or decrease the amount of a liquid in the hydraulic cavity device; the hydraulic cavity device can drive the drive axle housing to move upward and downward.

3. The auto-leveling drive axle device for a wheeled tractor according to claim 2, wherein, the hydraulic cavity device comprises a vertical cylinder tube and a vertical cylinder body; the vertical cylinder tube is sleeved over the vertical cylinder body on a top end thereof, a hydraulic cavity is formed between the vertical cylinder body and the vertical cylinder tube, and the vertical cylinder body is supported by the vertical cylinder tube; the hydraulic cavity is connected through a hydraulic pipeline to the solenoid hydraulic directional valve of the hydraulic system; the position of the vertical cylinder body and the position of a wheel center are limited by the wheel-side planetary reduction gear mechanism; the vertical cylinder tube is fixedly connected to the drive axle housing; the vertical cylinder tube can move upward and downward along the vertical cylinder body, and thereby drives the drive axle housing to move upward and downward; the vertical transmission shaft penetrates through the center of the vertical cylinder tube and the center of the vertical cylinder body, and can rotate with respect to the vertical cylinder tube and the vertical cylinder body.

4. The auto-leveling drive axle device for a wheeled tractor according to claim 3, wherein, the vertical cylinder tube is dynamically sealed against the vertical cylinder body; the vertical transmission shaft is dynamically sealed against the vertical cylinder tube and the vertical cylinder body respectively.

5. The auto-leveling drive axle device for a wheeled tractor according to claim 2, wherein, the inclination sensor is a transverse inclination sensor or a longitudinal inclination sensor, the transverse inclination sensor is mounted on the drive axle housing, the longitudinal inclination sensor is mounted on a frame; the electronic control unit comprises a single-chip and peripheral signal acquisition and operational amplifier circuits.

6. The auto-leveling drive axle device for a wheeled tractor according to claim 1, wherein, the half-shaft bevel gear is mounted on the drive axle housing by a bearing; the vertical shaft upper bevel gear is connected to the vertical transmission shaft via a spline.

7. The auto-leveling drive axle device for a wheeled tractor according to claim 1, wherein, the drive axle device is applied on a front drive axle and a rear drive axle of the wheeled tractor;

the front drive axle is connected to a frame by a ball-hinge connective pair of which the ball center is in the extension line of a front axle driving shaft;

and the rear drive axle is connected to the frame by two ball-hinge connective pairs of which the center point of a connecting line segment between the ball centers of the two ball-hinge connective pairs is on a rear axle driving shaft.

8. The auto-leveling drive axle device for a wheeled tractor according to claim 1, wherein, the drive axle device may also be applied on a chassis of a hillside tractor or a self-travel machine.

9. A method of auto-leveling for a wheeled tractor comprising the steps of:

a. when the entire tractor is transversely inclined, detecting the transverse inclination angle of a drive axle housing by a transverse inclination sensor mounted on the drive axle housing, and transmitting a signal of the detected inclination angle to an electronic control unit;

b. issuing a command by the electronic control unit to a solenoid hydraulic directional valve of a hydraulic system according to the signal of detected transverse inclination, so that two ports of the solenoid hydraulic directional valve are energized, and thereby an oil cavity at a lower side is fed with oil while an oil cavity at a higher side discharges oil;

c. when the oil cavity at the lower side of the drive axle housing is fed with oil, the volume of the oil cavity at the lower side of the drive axle housing is increased, pushing a vertical cylinder tube at the lower side of the drive axle housing to displace upward and thereby driving the lower side of the drive axle housing to move upward; when the oil cavity at the higher side of the drive axle housing discharges oil, a vertical cylinder tube at the higher side of the drive axle housing is pushed to move downward under the gravity load of the drive axle housing and thereby driving the higher side of the drive axle housing to move downward, till the two ends of the drive axle housing are in horizontality; and d. when the transverse inclination sensor detects that the transverse inclination is 0, controlling the solenoid hydraulic directional valve by the electronic control unit, so that neither port of the solenoid hydraulic directional valve is energized and a valve spool is located in a middle position, and thereby the distances from the two ends of the drive axle housing to the wheel centers of a left wheel and a right wheel are kept unchanged respectively, and thus the auto-leveling process of the drive axle is accomplished.

10. The method of auto-leveling for a wheeled tractor according to claim 9, further comprising: utilizing a longitudinal inclination sensor mounted on a frame to realize longitudinal leveling of the wheeled tractor.

* * * * *